United States Patent Office 3,118,764
Patented Jan. 21, 1964

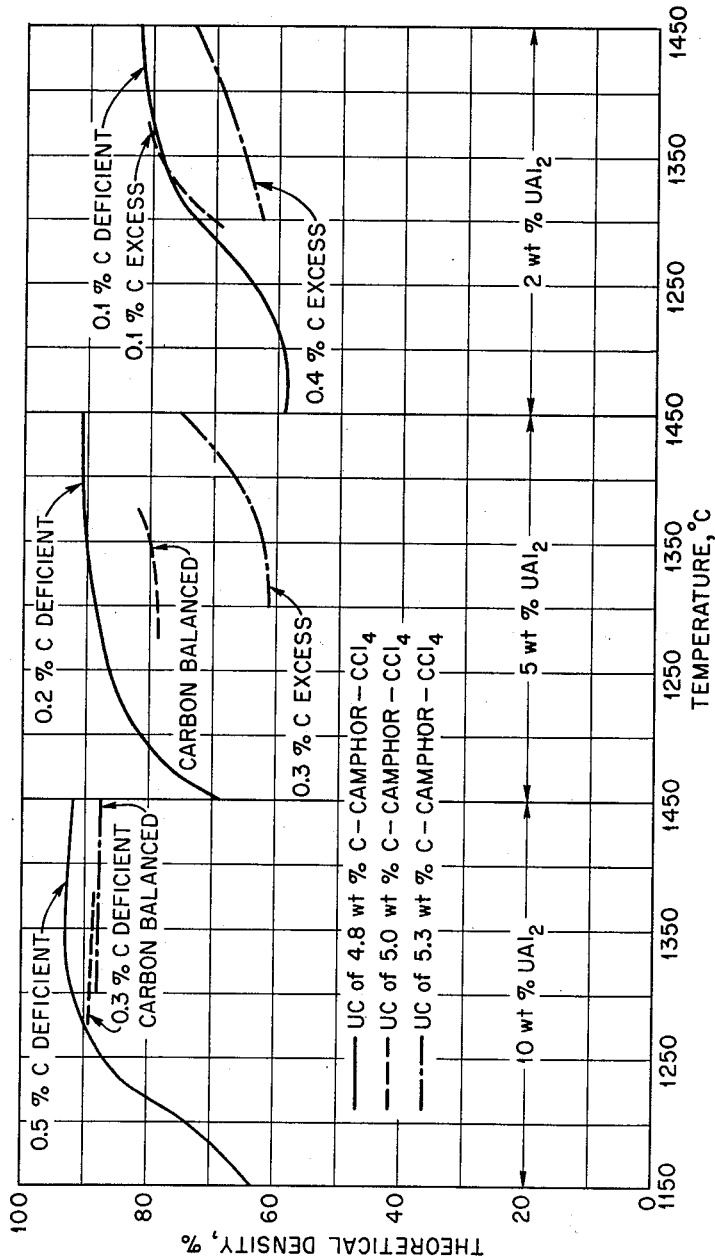

3,118,764
LIQUID PHASE SINTERING OF METALLIC CARBIDES
Joseph P. Hammond and John D. Sease, both of Knoxville, Tenn., assignors to the United States of America as represented by the United States Atomic Energy Commission
Filed Dec. 1, 1961, Ser. No. 157,052
12 Claims. (Cl. 75—204)

The present invention relates generally to liquid phase sintering and to an improved method of fabricating compacts of uranium monocarbide utilizing liquid phase sintering. More particularly the invention is concerned with a method of sintering powdered compacts of uranium monocarbide in the presence of a liquid phase and to the resultant product produced thereby.

A major obstacle to the production of economical power from nuclear reactors is the lack of a completely satisfactory solid nuclear fuel which can operate at high power levels to high fuel burn-ups at high temperatures. For use as a high-temperature nuclear fuel, uranium carbide is possessed of a desirable combination of physical and nuclear properties among which include high melting point, high uranium density, high thermal conductivity, low parasitic neutron absorption cross section and good thermal and radiation stability. A review of current knowledge of uranium carbide as a nuclear fuel is given in Nuclear Engineering, vol. 5, No. 51, September 1960, pages 353–357.

In order to take advantage of these desirable properties and particularly its high uranium density, fuel element shapes and parts fabricated from uranium carbide powder must be pressed and sintered at temperatures of the order of 2000° C. As a practical matter, such high temperatures are technically difficult to achieve and expensive to maintain on a production level. Moreover, at such high temperatures, there is a distinct tendency that the uranium will volatilize, leaving a sintered compact of indeterminate fuel content.

It is a general object of this invention to provide a method of reducing the sintering temperature required to achieve theoretical or near theoretical density of a powdered metal compact.

A major object of this invention is to provide a method of sintering a powdered uranium carbide compact into a uniformly dense shape having a density approaching the theoretical density of pure uranium carbide as measured by X-ray diffraction analysis.

A further object of this invention is to provide a method of sintering uranium carbide powder in the presence of a liquid phase to achieve maximum densification at temperatures as low as about 1200° C. and no greater than about 1500° C.

Another object of this invention is to lower the sintering temperature of uranium carbide required to achieve maximum theoretical density.

A further object of this invention is to provide a sintered uranium carbide product having a density approaching the theoretical uranium density of pure uranium carbide.

A still further object is to provide a sintered uranium carbide product produced by the process hereinafter to be described and claimed.

With these and other objects in mind, the method of the present invention in one of its broad aspects comprises the steps of forming a homogeneous powdered mixture of uranium carbide powder and a uranium containing intermetallic compound which will form a eutectic with said uranium carbide at a temperature below about 1500° C. wherein said intermetallic is further characterized in that the non-uranium containing component is volatile under vacuum at sintering temperatures below said temperature, pressing said mixture to a desired preformed shape and then vacuum sintering said shape at a temperature in the range 1200–1500° C. to volatilize at least a portion of the non-uranium containing component of said eutectic for a period sufficient to produce maximum densification of said compacted shape.

We have found that the sintering performance of uranium carbide may be promoted at temperatures within the range of 1200–1500° C. in the presence of a liquid phase produced by a melting eutectic produced by uranium carbide and certain selected intermetallic compounds of uranium. Of particular note is the character of the final sintered product. At comparatively low sintering temperatures, additions of eutectic forming uranium intermetallics will result in values of density hitherto unobtainable without at least reducing the uranium density of the final product. Whereas a UC powdered compact with no sintering depressant will sinter to a final sintered bulk density of about 75 to 83 at temperatures in the range 1200–1500° C., sintered densities of 93 to 99 can be achieved within the same temperature range in accordance with our invention. A distinctive feature of the present process is that the non-uranium portion of the eutectic or reaction constituent is virtually eliminated during the sintering process, leaving the final fully sintered uranium carbide product at its maximum density with virtually no penalty in regard to its physical properties, macroscopic neutron cross section, and permissible operating temperature as a nuclear fuel.

The intermetallic uranium compounds which are useful as sintering temperature depressants for the process of this invention for uranium carbide include uranium aluminide, $UAl_2$ and uranium beryllides such as $UBe_{13}$. For liquid phase sintering of thorium carbide powdered compacts, the useful sintering temperature depressants include thorium aluminide, $ThAl_2$ and thorium beryllide, $ThBe_{13}$. These materials have the common characteristic of being capable of wetting the uranium carbide and forming a eutectic therewith at a temperature of the order of 1200–1500° C. Moreover, when a vacuum below about $10^{-5}$ millimeters of mercury is applied during sintering, the non-uranium constituent of the intermetallic compound used is distilled or volatilized from within the volume of the eutectic melt leaving a sintered uranium carbide compact having at least 90% of the theoretical density of pure uranium carbide based on the determined X-ray density of pure UC.

In order to practice the method of this invention as applied to uranium carbide, a powder metallurgical grade of uranium carbide having a particle size in the range .01 to 40 microns is homogeneously mixed with from about 2 to 20% by weight of the selected intermetallic compound and an approximately 2% solution of camphor dissolved in an organic solvent such as ethyl alcohol, petroleum ether, or carbon tetrachloride. This mixture is cold pressed to a desired shape under a pressure of from 10–50 tons per square inch to impart sufficient green strength to the composite so that it may be handled. The resultant composite is then vacuum sintered at a temperature in the range 1200 to 1500° C. for a time which is dependent principally on the size and volume of the green composite in order to achieve maximum densification.

The important process variables in this invention are the purity and stoichiometry of the uranium monocarbide and the type and amount of uranium intermetallic compound. The source of the uranium monocarbide is relatively immaterial. For example, it may be synthesized by arc melting elemental carbon and uranium and by several other methods which include reacting uranium dioxide and carbon, ammonium diuranate and carbon or by reaction of uranium metal with methane or propane. The impurity level of the uranium carbide starting material with respect to such materials as uranium dicarbide, uranium oxides, and especially total carbon is important. Small amounts of uranium dicarbide and/or uranium dioxide may be tolerated in the sense that these materials do not interfere with the liquid phase sintering operations, but can be harmful in the sense that the maximum possible densification of the finally sintered uranium carbide product may not be reached. The amount of total carbon in the uranium carbide starting material is important in the sense that it has been found to interfere with the vacuum sintering operation and also determines the amount of free uranium, in the form of alpha uranium, which is retained in the finally sintered uranium carbide product.

A better appreciation of the effect of these and other variables and the effects they have on the finally desired sintered product will be had from a consideration of the following examples.

EXAMPLE I

The general procedure used in preparing the uranium carbide compacts using uranium aluminide as the sintering temperature depressant was as follows:

The powdered UC and $UAl_2$ used in this and the following example were prepared from arc-cast ingots of these compounds. The UC ingot was crushed to about a −30 mesh size and mixed in the desired proportions and finally ball-milled to yield a powder having an average particle size of less than about 5 microns. The same procedure was used to produce a powder from an arc-cast $UAl_2$ ingot. The powders were then weighed out in the desired proportions together, mixed with a solution of camphor in petroleum ether, and blended to form a homogeneous fluidized mixture. The organic solvent was evaporated and then portions of said mixture were pressed in a die and cold pressed at pressures ranging from about 10–25 tons per square inch to a desired green density generally between 50–70 percent of the UC theoretical density. Sintering was performed in a vacuum furnace provided with tantalum strip heaters using either a graphite or beryllia crucible to contain the green-pressed compacts. The compacts were fired to temperature on approximately 1000° C./hour schedule and held at temperature for three hours. In the cases where sintering was carried out under an inert gas (argon) atmosphere, a vacuum heating phase was employed to flush off and remove the organic binder up to a temperature of about 700° C. An inert gas was then flowed into the furnace during the sintering phase. After sintering the samples were cooled either vacuum or in the presence of an inert gas to room temperature.

The general procedure described above was employed to prepare a number of UC compacts which were sintered at temperatures in the range 1150–1500° C. for three hours wherein the amount of total carbon, i.e., the stoichiometry of the uranium carbide, was varied from 4.8 weight percent carbon to 5.3 weight percent carbon and the amount of uranium aluminide was varied from 2 weight percent to 10 weight percent based on the weight of the total mixture. The results are summarized in the accompanying figure which presents curves which show the effect of the sintering temperature, amount of $UAl_2$, and the carbon level in the uranium carbide on the density of the finally sintered uranium carbide product. Referring to the curves included in the graph of FIG. 1, it will be seen that the density of the sintered uranium carbide compact increased as the amount of uranium aluminide was increased from 2 to 10 weight percent and as the stoichiometry (carbon level) of the uranium carbide was decreased. We have found that the maximum theoretical density achievable is a function of the amount of uranium aluminide used. It will be seen that maximum densities were achieved when the green strength compacts contained from 5 to 10 weight percent uranium aluminide. While lower amounts, as low as 2 weight percent uranium aluminide, can be used, the final sintered density will be lower than what is generally desirable for a nuclear fuel. Our experience has been that no apparent advantage is gained by the use of appreciably greater amounts than about 10 weight percent uranium aluminide in terms of achieving desired sintered density. The curves clearly indicate that the densities of the compacts increase with increasing temperature beginning with 1150° C. and extending through 1500° C. For achieving usefully high densities in compacts having a minimum secondary constituent, i.e., alpha uranium and/or uranium aluminide, a sintering temperature in the range of 1350–1450° C. at a pressure below $10^{-5}$ millimeters of mercury should be used. Of particular note is the effect of the carbon level on the final sintered density. The amount of carbon theoretically available for combination with the uranium as a result of the disproportionation of the uranium aluminide under vacuum sintering conditions is shown next to each curve of the graph. It will be seen that the greater the amount of carbon in the volume of the compact which is available for combination with uranium of

*Table 1*

FABRICATION RESULTS FOR UC—7.5 WT. PERCENT $UAl_2$

| Experiment No. | Carbon Content of UC | Sintering [f] condition | | Green Density (percent of theoretical) [a] | Sintered Density (percent of theoretical) [b] | Aluminum Analysis | | Microstructure | | Grain Size, grains/in.[2] |
|---|---|---|---|---|---|---|---|---|---|---|
| | | Temp.[g] (° C.) | Atmosphere | | | Content [c] (wt. percent) | Percent loss | Secondary Constituent | | |
| | | | | | | | | Approx., volume percent | Identity [e] | |
| 1 | 4.8 | 1,250 | Vacuum[d] | 68.5 | 88.5 | 0.99 | 29.0 | 6–7 | | 250 |
| 2 | 4.8 | 1,300 | do.[d] | 68.0 | 91.0 | 0.90 | 35.0 | 6 | $UAl_2$, α−U | 128 |
| 3 | 4.8 | 1,350 | do.[d] | 68.5 | 91.0 | 0.07 | 95.0 | <½ | α−U | 64 |
| 4 | 4.8 | 1,400 | do.[d] | 68.5 | 92.5 | | | <½ | α−U | 64 |
| 5 | 4.8 | 1,450 | do.[d] | 68.5 | 93.5 | 0.045 | 97.0 | <½ | α−U | 16 |
| 6 | 4.9 | 1,350 | do.[d] | 67.0 | 91.0 | | | | | |
| 7 | 4.9 | 1,400 | do.[d] | 67.0 | 92.5 | | | | | |
| 8 | 5.1 | 1,250 | do.[d] | 66.5 | 87.0 | | | 10 | $UAl_2$, α−U | >500 |
| 9 | 5.1 | 1,300 | do.[d] | 66.5 | 86.5 | | | 10 | | >500 |
| 10 | 5.1 | 1,350 | do.[d] | 66.5 | 90.0 | 1.07 | 28.0 | 10 | | 500 |
| 11 | 5.1 | 1,400 | do.[d] | 66.5 | 89.0 | 0.97 | 30.0 | 10 | | 500 |
| 12 | 5.1 | 1,450 | do.[d] | 66.5 | 90.0 | | | 8–9 | αU, $UAl_2$ | 250 |
| 13 | 4.8 | 1,350 | Argon | 69.5 | 93.5 | 1.39 | 0 | | $UAl_2$ | |
| 14 | 4.8 | 1,400 | do. | 69.5 | 93.5 | 1.39 | 0 | | $UAl_2$ | |
| 15 | 4.8 | 1,450 | Vacuum[d] | 69.5 | 96.0 | 0.10 | 93.0 | <2 | | |

[a] Based on density of UC—7.5 wt. percent $UAl_2$.
[b] Based on X-ray density of UC (13.63 g./cc.).
[c] By wet chemical, average of duplicate tests.
[d] Between $10^{-5}$ and $5 \times 10^{-7}$ mm. Hg.
[e] As identified by X-ray diffraction analysis.
[f] A graphite crucible contained the sample in runs 1–14; in run 15 a BeO crucible was used.
[g] Sintering time was three hours.

the aluminide, the less is the final sintered density of the UC compact. The latitude of this and other process variables will be more evident in the next example.

EXAMPLE II

In this example a series of fifteen runs were made under the same conditions described in the preceding example except that in each run the amount of intermetallic sintering depressant, $UAl_2$, used was kept constant at 7.5 weight percent. The results are summarized in Table I. It is again noticeable that a hyperstoichiometric uranium carbide (stoichiometric UC contains 4.8 weight percent C) appears to result in a somewhat reduced final sintered density and also in an increased retention of secondary constitutents consisting of alpha uranium and/or $UAl_2$. The trace of secondary constituents which were retained in the sintered compacts were found, by metallographic examination, to consist of equiaxed particles evenly distributed throughout the volume of the compact. In runs 1–14 the UC—$UAl_2$ green composites were sintered in a graphite receptacle; in run 15 a beryllia receptacle was used. When the sintering receptacle was beryllia, the finally sintered compound had a sintered density somewhat greater than was the case for graphite. The use of a beryllia or other similar refractory receptacle for containing the green composites during vacuum sintering is apparently beneficial. The use of graphite receptacles seems to contribute some carbon which affects the final sintered density in the same way as does hyperstoichiometric uranium carbide. Runs 12–14, which were conducted under an argon atmosphere illustrates the fact that all of the intermetallic sintering depressant was retained as a secondary constituent in the finally sintered product. While this is not the preferred method of conducting the subject process nor is the product generally regarded as desirable as compared to one where the secondary constituent is virtually absent, it still is nevertheless useful as a nuclear fuel and the benefit of significantly reduced sintering temperatures in comparison to that required to sintering uranium carbides without the aid of a sintering depressant is retained.

It will be seen that, in its broadest aspect, there has been described a process of sintering a powdered high melting metallic compound in the presence of a liquid phase and characterized further in that the liquid phase was produced by the addition to said compound of a sintering depressant material which wets said metallic compound and forms a eutectic with it at a temperature far below the sintering temperature of said metallic compound powder to effect sintering at about the temperature range of the melting eutectic phase. In its preferred aspect the invention contemplates conducting the sintering under vacuum conditions to remove the second component of said material by volatilization from the volume of the sintering compact. In another variation sintering may be conducted without the use of vacuum and this retains the sintering aid as a secondary constituent within the volume of the finally sintered product. However, as previously point out, this variation may produce a product of less utility than that achieved by the use of vacuum sintering.

In still another variation of our invention, the sintering depressant material is retained in the finally sintered product and, surprisingly, a discrete secondary phase is not found to exist. Thus in the case where the sintering depressant is a uranium silicide used in amounts of less than 2% by weight, it will be found that the silicon will be retained within the volume of the finally sintered compact; yet no discrete silicide secondary phase will be evident. In such cases, it is thought that the silicon atoms replace the carbon in the UC crystal lattice with the substituted carbon atoms migrating from their normal position in the lattice. However, this attempt at explaining the mechanism which leads to the absence of the normally expected secondary phase should not be construed as limiting the invention in any sense.

A unique feature of this invention is that the sintering additive can be virtually eliminated from the sintering composite where its presence is undesired. Thus, in the specific embodiment hereinbefore disclosed, the aluminum portion of the uranium aluminide sintering depressant material can be, because of its relatively high vapor pressure at the sintering temperaure range, virtually quantitatively volatilized from the volume of the sintering compact. The resultant sintered uranium carbide nuclear fuel can be used at operating nuclear reactor temperatures far in excess of those possible with the uranium aluminides present in significant amounts in the volume of the finalls sintered compact. It may be noted here that we attempted the use of aluminum metal, finely divided and powdered, and other metals as sintering aid depressants and found that we were unable to volatilize the metals at the lowered sintering temperatures even though the vapor pressures of these metals at the sintering temperatures were quite high.

Of equal interest is the case where a uranium bismuthide, UBi, was used as the sintering aid depressant. In that case the bismuth was readily vaporized at the sintering temperature, but the final product had not sintered to any practical density. Apparently the bismuth or the bismuthide did not wet the internal volume green pressed compacted powder sufficiently to effect the increased density nomrally expected during sintering.

As might be expected, the finally vacuum sintered uranium carbide product is somewhat porous due to the migration of the aluminum from within the volume of the compact as it is being volatilized under vacuum conditions. However, and this is a significant point, the resultant pores are of the closed-pore type in which individual pores within the volume of the uranium carbide are not interconnected. This is highly beneficial in a nuclear fuel since such closed-pore system, in effect, provides a convenient retaining volume for gaseous fission products produced within the volume of the fissioning fuel.

While this invention has been illustrated in terms of UC as the material to be sintered, it should be understood that the broad concept of liquid phase sintering may be applied to other high melting carbides and other compounds which require sintering at temperatures of the order of 2000° C. or more to reach a usefully high densification. For example, the method of this invention can also be applied to ThC powder or to powdered mixture ThC and UC to reduce the sintering temperature normally required to achieve maximum densification. For example, in reactors which utilize a carbide fuel and operate under a thorium 232-uranium 233 breeder cycle the fuel may consist of sintered shapes of UC and ThC. A densified UC—ThC compact may be achieved at sintering temperatures considerably below 2000° C. by employing $ThAl_2$ or $ThBe_{13}$ as the sintering depressant material. Likewise the method can be applied to mixtures of US and PuC to reduce the sintering temperature normally required to achieve maximum density in this fuel system.

An important area of utility for this invention lies in the use of a second refractory metal carbide to alter the physical and/or chemical properties of a first metal carbide. For example, thorium carbide and especially uranium carbide are relatively highly reactive. According to this invention uranium and/or thorium carbide or a pre-alloyed mixture thereof in powder form may be mixed with any of the carbides of zirconium, molybdenum, or niobium together with the selected class of sintering depressant materials of this invention and sintered to a desired density in accordance with the process of this invention at sintering temperatures below that which would be required to reach the same desired density in the absence of said sintering depressants.

The application of the unique liquid phase sintering method to other materials to realize the attendant advantages will readily occur to those skilled in the art in the light of the foregoing description and it should be understood that the particular embodiments hereinbefore described are for purposes of illustration only.

Having thus described our invention, we claim:

1. An improved method of fabricating uranium carbide composite which comprises forming a homogeneous mixture of powdered uranium carbide, a uranium intermetallic compound which wets and forms a eutectic with said carbide and has a non-uranium component which has a relatively high vapor pressure at a temperature in the range 1200–1500° C., and an organic binder, pressing said mixture to a composite of desired green strength, and then vacuum sintering said composite at the eutectic forming temperature for a period sufficient to remove at least a portion of the non-uranium containing component of said eutectic.

2. An improved method of fabricating a uranium carbide composite which comprises forming a homogeneous mixture of powdered uranium carbide, a uranium intermetallic compound selected from the group consisting of $UAl_2$ and $UBe_{13}$, and an organic binder, pressing said mixture to a composite of desired green strength, and then vacuum sintering said composite at about the temperature at which a eutectic forms between said carbide and said intermetallic compound for a period sufficient to remove at least a portion of the non-uranium containing component of said intermetallic compound.

3. An improved method of fabricating a uranium carbide composite which comprises forming a homogeneous mixture of powdered UC, finely divided $UAl_2$ in an amount in the approximate range 2–20% based on the weight of total mixture ($UC+UAl_2$) and a small amount of an organic binder, pressing said mixture to form a composite of desired green strength, and then vacuum sintering said composite at a temperature in the range 1200–1500° C. for a period of time sufficient to remove at least a portion of the aluminum in said composite.

4. The method according to claim 3 wherein the amount of $UAl_2$ used in forming the green strength composite is in the range 5–10 weight percent based on the weight of total mixture.

5. An improved method of fabricating a uranium carbide composite which comprises forming a homogeneous mixture of powdered UC containing from 4.8 to no more than about 5.3% carbon, finely divided uranium aluminide $UAl_x$ where $x$ is a number from 2 to 4 in an amount in the approximate range 2–20%, all based on the weight of total mixture and a small amount of an organic binder, pressing said mixture to form a composite of desired green strength, and then vacuum sintering said composite at a temperature in the range 1200–1500° C. for a period of time sufficient to remove at least a portion of the aluminum in said composite.

6. The method according to claim 5 wherein the uranium carbide is stoichiometric UC.

7. The method according to claim 5 wherein the amount of $UAl_2$ used to form the sintered composite is 5–10 weight percent of the total mixture.

8. An improved method of fabricating a uranium carbide composite which comprises forming a homogeneous mixture of powdered UC, finely divided $UAl_2$ in an amount in the approximate range 2–20% based on the weight of total mixture and a small amount of an organic binder, pressing said mixture to form a composite of desired green strength, and then sintering said composite at a temperature in the range 1200–1500° C.

9. A method of reducing the sintering temperature required to achieve maximum density of a powdered compact of a refractory metal carbide which comprises forming a homogeneous mixture consisting of a powder of said carbide, a finely divided metal compound XY which wets and forms a eutectic with said carbide at a temperature below the normal sintering temperature required to reach the theoretical density of said carbide wherein X is the metal of said carbide and Y is a metal which has a relatively high vapor pressure at the eutectic forming temperature, and an organic binder, pressing said mixture to a composite having a desired green strength and then vacuum sintering said composite at said eutectic forming temperature to remove at least a portion of said Y metal.

10. A powdered compact of uranium carbide having at least 90% the theoretical density of pure UC characterized further in that its internal volume is porous but of the closed-pore type, said compact having been produced by pressing a homogeneous mixture of said powder with a small quantity of $UAl_2$ and an organic binder to a desired green strength and then vacuum sintering the resultant composite within the range of temperature at which a eutectic is formed between said uranium carbide and said aluminum carbide.

11. An improved method of fabricating a uranium carbide composite which comprises forming a homogeneous mixture of powdered uranium carbide, an organic binder, and less than 2% by weight of a finely divided uranium silicide, pressing said mixture to a desired green strength, and then vacuum sintering the resultant green strength composite within the range of temperature at which a eutectic forms between said silicide and said carbide.

12. The method according to claim 11 wherein the silicide is selected from the group consisting of USi, $USi_2$, and $U_3Si_2$.

References Cited in the file of this patent

UNITED STATES PATENTS

| | | |
|---|---|---|
| 2,751,668 | Turner et al. | June 26, 1956 |
| 2,971,839 | Nussbaum | Feb. 14, 1961 |

OTHER REFERENCES

AEC Document NDA–2140–2, October 1959, pages 44 and 46.